(12) United States Patent
Kovac et al.

(10) Patent No.: US 8,608,420 B2
(45) Date of Patent: Dec. 17, 2013

(54) SELF-ATTACHING NUT

(75) Inventors: Zdravko Kovac, Chesterfield, MI (US); Jeffrey C. Lewis, Addison Township, MI (US); John M. Parker, Ann Arbor, MI (US)

(73) Assignee: Whitesell International Corporation, Taylor, MI (US)

( * ) Notice: Subject to any disclaimer, the term of this patent is extended or adjusted under 35 U.S.C. 154(b) by 293 days.

(21) Appl. No.: 12/767,766

(22) Filed: Apr. 26, 2010

(65) Prior Publication Data

US 2010/0209210 A1    Aug. 19, 2010

Related U.S. Application Data

(63) Continuation-in-part of application No. 11/895,368, filed on Aug. 24, 2007, now Pat. No. 8,142,125.

(51) Int. Cl.
*F16B 37/06*    (2006.01)

(52) U.S. Cl.
USPC ................................. 411/187; 411/180

(58) Field of Classification Search
USPC ................ 411/179–181, 188, 160, 187
See application file for complete search history.

(56) References Cited

U.S. PATENT DOCUMENTS

| | | | |
|---|---|---|---|
| 1,332,686 A * | 3/1920 | Reynolds | 285/202 |
| 3,213,914 A * | 10/1965 | Baumle et al. | 411/179 |
| 3,750,525 A * | 8/1973 | Waters et al. | 411/34 |
| 4,779,326 A * | 10/1988 | Ichikawa | 29/520 |
| 4,940,375 A | 7/1990 | Marvell et al. | |
| 5,251,370 A | 10/1993 | Muller et al. | |
| 5,335,411 A | 8/1994 | Muller et al. | |
| 5,423,645 A | 6/1995 | Muller et al. | |
| 5,531,552 A | 7/1996 | Takahashi et al. | |
| 5,549,430 A | 8/1996 | Takahashi et al. | |
| 5,613,815 A * | 3/1997 | Muller | 411/181 |
| 5,673,472 A * | 10/1997 | Muller | 29/432.1 |
| 5,797,175 A * | 8/1998 | Schneider | 29/520 |
| 5,882,159 A | 3/1999 | Muller | |
| 6,125,524 A * | 10/2000 | Mueller | 29/520 |
| 6,220,804 B1 | 4/2001 | Pamer et al. | |

(Continued)

FOREIGN PATENT DOCUMENTS

| | | |
|---|---|---|
| DE | 102008017689 | 10/2009 |
| EP | 0 713 982 A2 | 5/1996 |
| EP | 1 116 891 B1 | 2/2004 |

OTHER PUBLICATIONS

International Search Report and Written Opinion for PCT/US2011/033760 dated Jun. 28, 2011 (8 pages).

(Continued)

*Primary Examiner* — Flemming Saether
(74) *Attorney, Agent, or Firm* — Dierker & Associates, P.C.

(57) ABSTRACT

A self-attaching nut for attachment to a panel includes a central pilot portion having a bore therethrough, and having a substantially cylindrical outer surface. A flange portion surrounds the outer surface of the pilot portion, and the flange portion includes an annular groove surrounding the pilot portion. The annular groove has a substantially V-shaped axial cross section. The self-attaching nut further includes a plurality of spaced raised buttons formed on a surface of the annular groove. The spaced raised buttons are configured to substantially prevent relative rotation between the nut and the panel, and configured to aid in preventing pull-out of the nut from the panel.

12 Claims, 7 Drawing Sheets

(56) References Cited

U.S. PATENT DOCUMENTS

| | | |
|---|---|---|
| 6,302,629 B1 | 10/2001 | Hsiao |
| D454,484 S | 3/2002 | Pamer et al. |
| D457,054 S | 5/2002 | Pamer et al. |
| 6,851,904 B2 | 2/2005 | Parker et al. |
| 6,994,500 B2 | 2/2006 | Ward et al. |
| 7,001,125 B2 | 2/2006 | Wojciechowski et al. |
| 7,112,024 B2 | 9/2006 | Ward et al. |
| 7,112,025 B2 | 9/2006 | Ward et al. |
| 7,112,143 B2 | 9/2006 | Muller |
| 7,124,492 B2 * | 10/2006 | Wojciechowski et al. ...... 29/515 |
| 7,367,767 B2 * | 5/2008 | Babej ........................... 411/181 |
| 2004/0234356 A1 | 11/2004 | Parker et al. |
| 2009/0196678 A1 | 8/2009 | Babej et al. |

OTHER PUBLICATIONS

Preliminary Examination Report on Patentability for International Appln. No. PCT/US2008/010001 dated Mar. 4, 2010 (7 pages).

\* cited by examiner

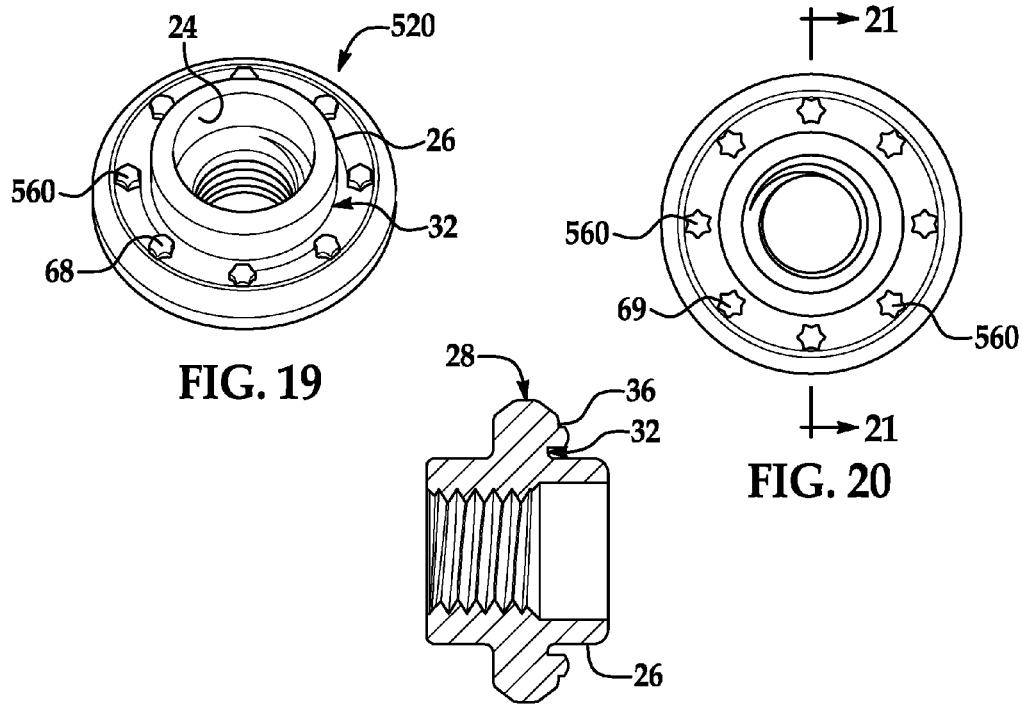
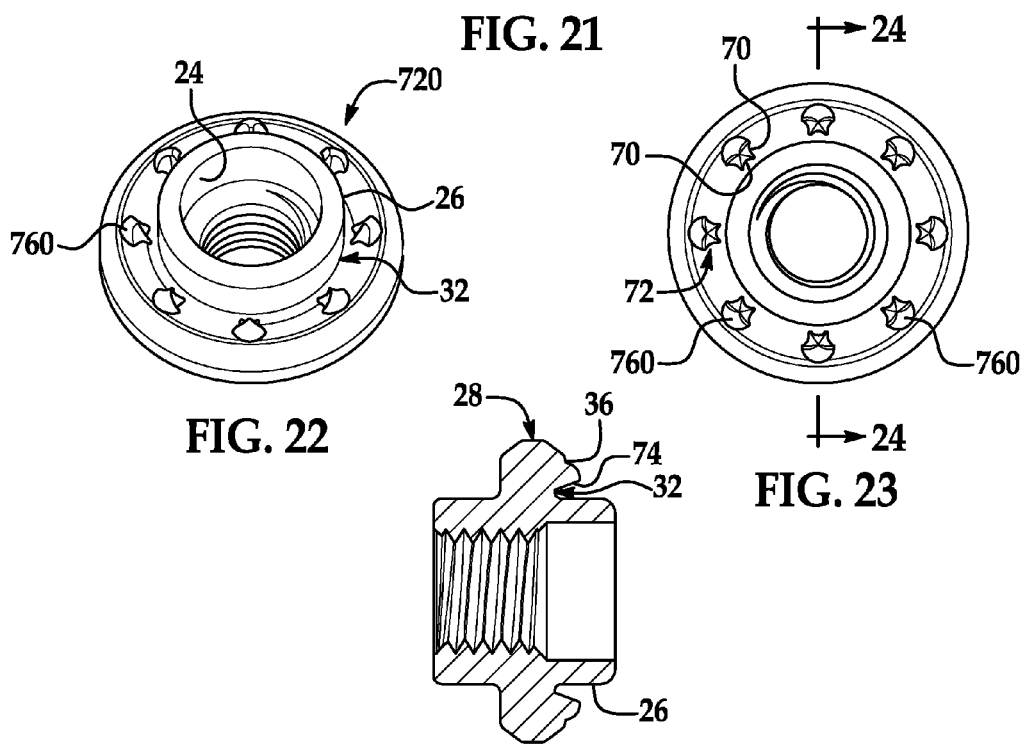

SELF-ATTACHING NUT

This application is a continuation-in-part of U.S. application Ser. No. 11/895,368, filed Aug. 24, 2007, now U.S. Pat. No. 8,142,125 which is incorporated by reference herein in its entirety.

BACKGROUND

Self-attaching nuts, including pierce and clinch nuts, may be formed by cold header techniques and secondary press operations. The self-attaching nuts are generally installed in a panel using a press to plastically deform a portion of the nut, thereby capturing the panel.

SUMMARY

A self-attaching nut for attachment to a panel is disclosed herein. The self-attaching nut includes a central pilot portion having a bore therethrough, and having a substantially cylindrical outer surface. A flange portion surrounds the outer surface of the pilot portion, and the flange portion includes an annular groove surrounding the pilot portion. The annular groove has a substantially V-shaped axial cross section. The self-attaching nut further includes a plurality of spaced raised buttons formed on a surface of the annular groove. The spaced raised buttons are configured to substantially prevent relative rotation between the nut and the panel, and are configured to substantially prevent pull-out of the nut from the panel.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 19 is an end perspective view of a further embodiment of a self-attaching nut according to the present disclosure;

FIG. 20 is an end view of the self-attaching nut shown in FIG. 19;

FIG. 21 is a side cross-sectional view taken along line 21-21 of FIG. 20;

FIG. 22 is an end perspective view of another embodiment of a self-attaching nut according to the present disclosure;

FIG. 23 is an end view of the self-attaching nut shown in FIG. 22;

FIG. 24 is a side cross-sectional view taken along line 24-24 of FIG. 23;

DETAILED DESCRIPTION

The present disclosure relates generally to a self-attaching female fastener (e.g., a nut) for attachment to a panel.

Figure 1:
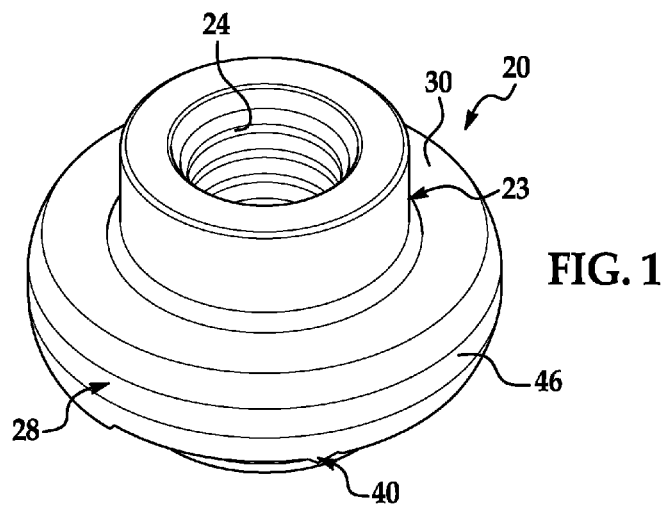
FIG. 1 is an end perspective view of an embodiment of a self-attaching nut according to the present disclosure.
Figure 2:
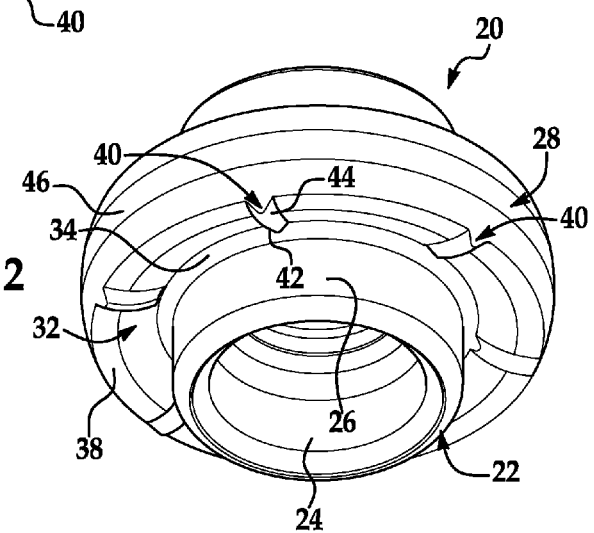
FIG. 2 is an end perspective view of the self-attaching nut of FIG. 1, but shown from the opposite end.
Figures 5, 6:
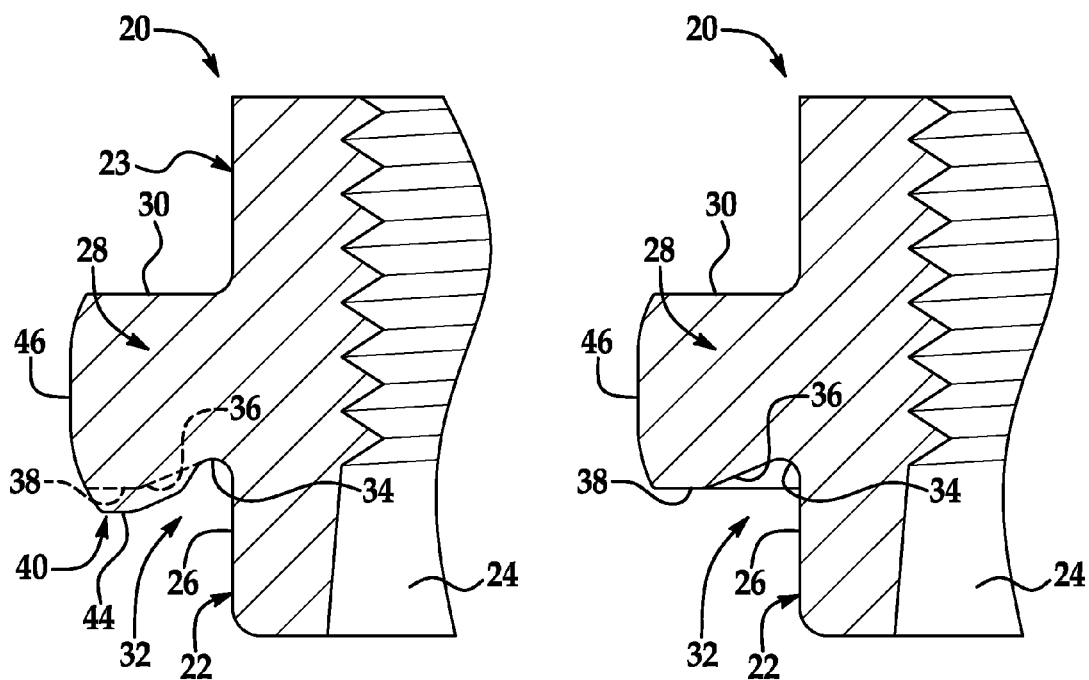
FIG. 5 is a cutaway, side cross-sectional view taken along line 5-5 of FIG. 4.
FIG. 6 is a cutaway, side cross-sectional view taken along line 6-6 of FIG. 4.

Referring now to FIG. 1, an embodiment of the self-attaching nut 20 shown in FIGS. 1-6 includes a central pilot portion 22 having a bore 24 therethrough and an outer surface 26 which may be substantially cylindrical, as shown. A flange portion 28 surrounds the outer surface 26 of the central pilot portion 22. Flange portion 28 has an annular back face 30 surrounding the central pilot portion 22. As shown in FIG. 1, the annular back face 30 may be planar, extending perpendicularly to a longitudinal axis of the bore 24. The opposed or obverse face of the flange portion 28 includes a substantially V-shaped annular groove 32 surrounding the central pilot portion 22. In this embodiment, the annular groove 32 is "substantially V-shaped," because the groove may include an arcuate surface 34 joining the outer surface 26 of the central pilot portion 22 and the inclined outer surface 36 (as shown in FIG. 6). The substantially V-shaped annular groove 32 may further include ribs, as described herein. The annular flange portion 28 may include an annular panel support surface 38 which may abut a panel 80 (shown in FIGS. 28-30) during installation of the self-attaching nut 20 to the panel 80. In the embodiment shown in FIGS. 1-6, the annular panel support surface 38 is substantially planar and lies substantially within a plane perpendicular to the longitudinal axis of the bore 24. As used herein, "substantially planar" is defined to mean having a flatness within 1.0 mm, within 5 mm of the self-attaching nut 20 (using standard Geometric Dimensioning and Tolerancing (GD&T), a flatness of 1 mm means +/−0.5 mm from the center).

Figure 3:
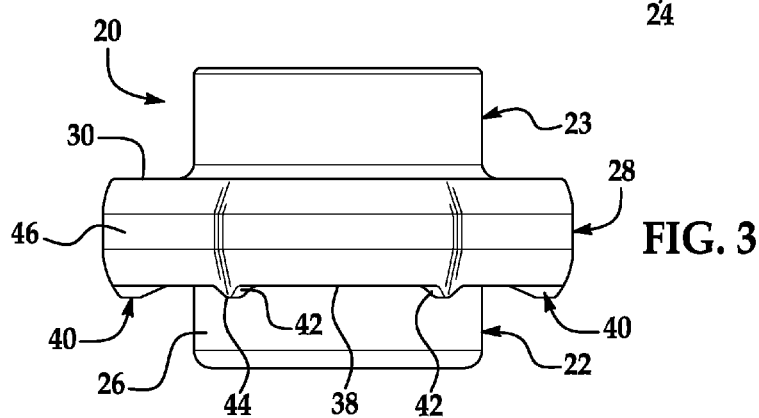
FIG. 3 is a side view of the embodiment of the self-attaching nut shown in FIGS. 1 and 2.
Figure 4:
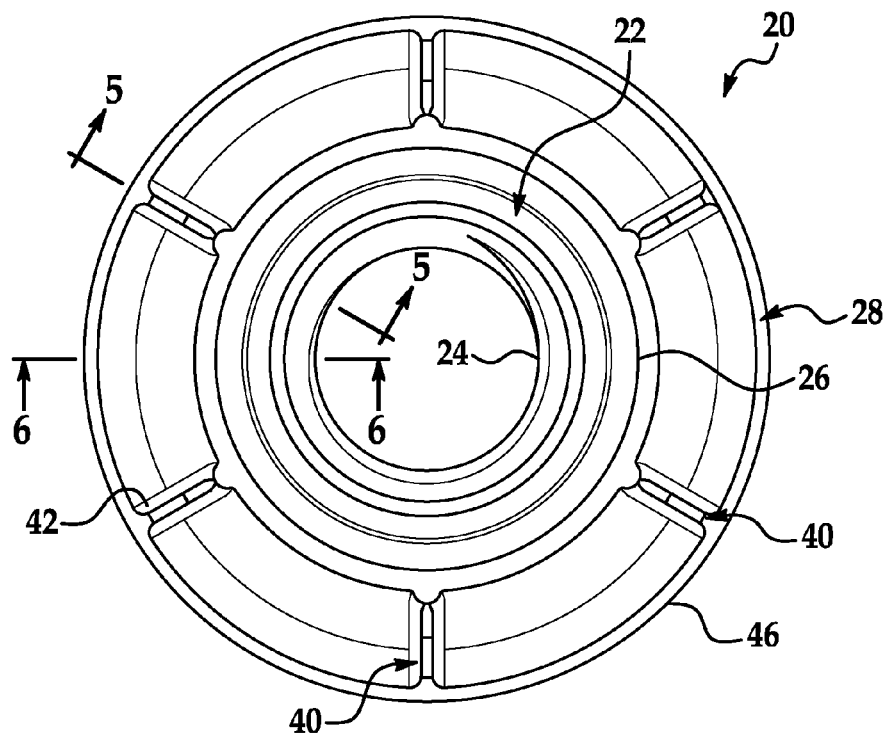
FIG. 4 is an end view of the self-attaching nut shown in FIGS. 1 to 3.

As will be understood from the present description, embodiments of the self-attaching nut 20 include formations which provide resistance to rotation of the nut or torque resistance following installation of the nut in the panel 80. The formations may also provide resistance to pulling the nut out of the panel 80 after installation. In the embodiment of the self-attaching nut 20 shown in FIGS. 1-6, the annular panel support or bearing surface 38 includes a plurality of circumferentially spaced radial ribs 40 which extends to the outer surface 46 of the flange portion 28 and radially inwardly on the inclined outer surface 36 of the V-shaped annular groove 32, as best shown in FIG. 5. In this embodiment, the radial ribs 40 are convex and substantially triangular in cross-section, having radial relatively inclined side faces 42 and a top surface 44, as best shown in FIG. 3.

As also shown in FIG. 5, the top surfaces 44 of the radial ribs 40 are inclined inwardly, and the ribs 40 are spaced from the outer surface 26 of the central pilot portion 22. In the disclosed embodiment, the annular flange portion 28 is substantially cylindrical, as shown. However, the annular flange portion 28 may also be polygonal, e.g., rectangular or square. The top surface 44 of the radial ribs 40 may be rounded, as shown in FIG. 3. The bore 24 may be threaded (as shown) to receive a threaded bolt or male fastener, or unthreaded to receive a self-tapping or thread rolling male fastener. It is to be understood that threads shown in the figures are semi-schematic. Where left hand or right hand threads are shown in the figures, threads in the opposite direction may be used. Embodiments of the self-attaching nut 20 may include a tubular body extension 23 projecting from the annular back face 30, e.g., as shown in FIGS. 1 and 3, to provide sufficient threads to meet certain proof load requirements. In an embodiment, the tubular body extension 23 may be substantially cylindrical. However, it is to be understood that tubular body extension 23 may also be polygonal, e.g., square or hexagonal, as shown at 23' in FIGS. 32 and 33.

Figure 7:
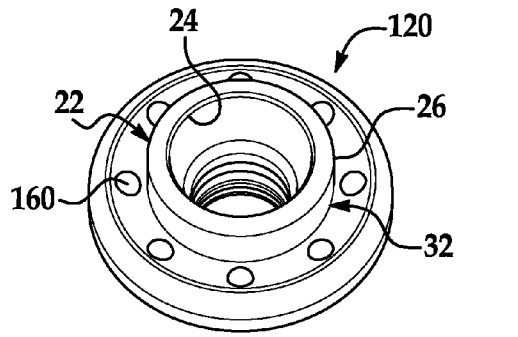
FIG. 7 is an end perspective view of another embodiment of a self-attaching nut according to the present disclosure.
Figure 8:
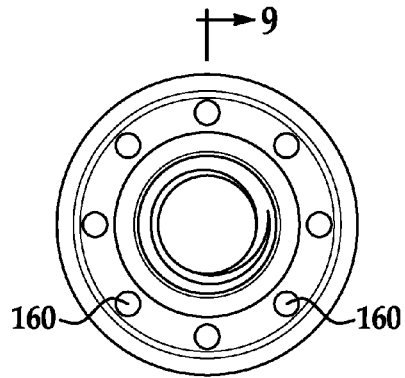
FIG. 8 is an end view of the self-attaching nut shown in FIG. 7.
Figure 9:
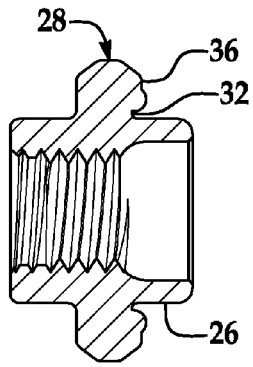
FIG. 9 is a side cross-sectional view taken along line 9-9 of FIG. 8.

Referring now to FIGS. 7-9, it is to be understood that embodiments of a self-attaching nut 120 have common elements with embodiments of self-attaching nut 20. The common elements are numbered with the same numbers as the corresponding elements of the self-attaching nut 20 shown in FIGS. 1-6. Where elements are similar but not identical, the elements of the self-attaching nut 120 are numbered in the 100 series. Similarly, in subsequent Figures, where elements are similar but not identical, the elements of the self-attaching nut 220, 320 are respectively numbered in the 200, 300 series, and so on. Briefly, the self-attaching nut 120 shown in FIGS. 7-9 includes a central pilot portion 22 having a bore 24 and an outer surface 26 which may be cylindrical, as shown. A flange portion 28 surrounds the central pilot portion 22 and includes a substantially V-shaped annular groove 32 defined by the outer surface 26 of the central pilot portion 22 and the inclined outer surface 36 (as described above).

Still referring to FIGS. 7-9, embodiments of self-attaching nut 120 may include a plurality of spaced raised buttons 160 formed on a surface of the V-shaped annular groove 32. The spaced raised buttons 160 (as well as buttons 260, 360 etc. in other embodiments) may be configured to substantially prevent relative rotation between the self-attaching nut 120 (220, 320, etc.) and the panel 80 (in other words, buttons 160, 260, 360, etc. may function as anti-rotation features), and also may be configured to aid in preventing pull-out of the self-attaching nut 120 (220, 320, etc.) from the panel 80 (shown in FIGS. 28-30).

In this disclosure, "aid in preventing pull-out of the self attaching nut 120, 220, 320, etc. from the panel 80" means the spaced raised buttons 160, 260, 360, etc. may contribute to preventing the nut 120, 220, 320, etc. from becoming detached from the panel after an application of high force to the nut 120, 220, 320, etc. along the longitudinal axis of the bore 24. The definition of high force depends on several factors, including the size of the self-attaching nut, the thickness of the panel 80, and the materials used to make the self-attaching nut and the panel. In an embodiment, pull-out will generally be prevented at least when a force between about 2.4 kN to 13.0 kN is applied to the nut 120, 220, 320, etc. along the longitudinal axis of the bore 24.

It is to be understood that "button" as used herein means a formation having an aspect ratio of less than about 1. In the present disclosure, aspect ratio means a ratio of a largest height dimension to a largest width dimension. The height dimension is in a direction substantially parallel to the longitudinal axis of the bore 24. The width dimension is orthogonal to a line along the height dimension. It is to be further understood that in the present disclosure, a button is distinguished from a rib. Further, as used herein, a rib is substantially longer in a direction that is substantially radial with respect to the longitudinal axis of the bore 24, compared to a dimension orthogonal to a radius of the bore 24. Still referring to FIGS. 7-9, each of the plurality of spaced raised buttons 160 may be a substantially spherical cap shape. For example, each of the plurality of spaced raised buttons 160 may be substantially hemispherical.

Figure 10:
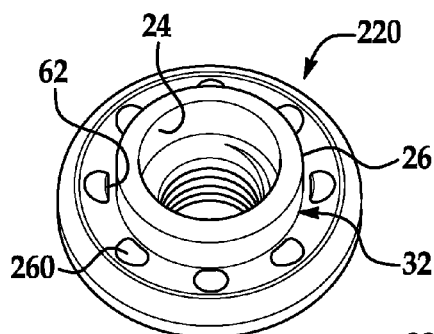
FIG. 10 is an end perspective view of yet another embodiment of a self-attaching nut according to the present disclosure.
Figure 11:
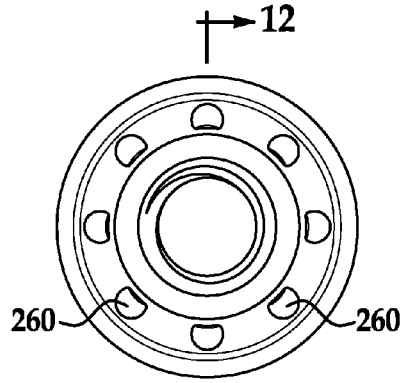
FIG. 11 is an end view of the self-attaching nut shown in FIG. 10.
Figure 12:
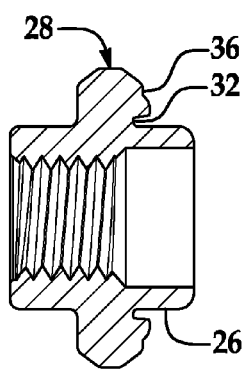
FIG. 12 is a side cross-sectional view taken along line 12-12 of FIG. 11.

In embodiments of a self-attaching nut 220 shown in FIGS. 10-12, each of the plurality of spaced raised buttons 260 may be a substantially spherical cap shape with a circumferentially concave facet 62 defined thereon. The circumferentially concave facet 62 may be substantially concentric to the bore 24.

Figure 13:
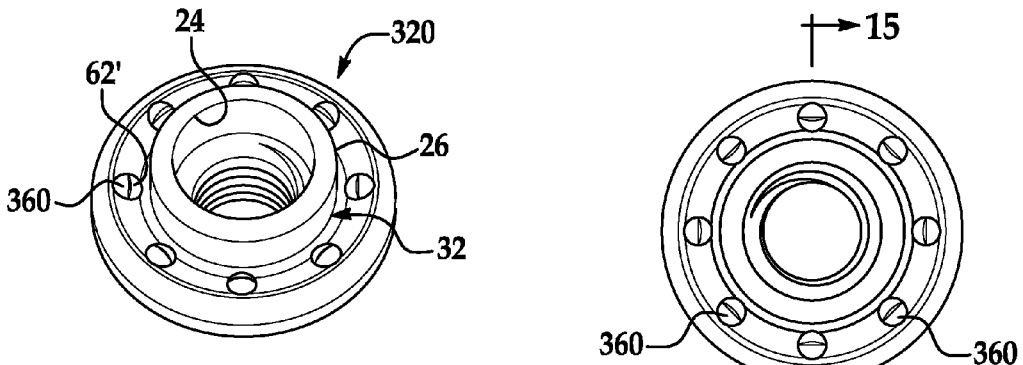
FIG. 13 is an end perspective view of a further embodiment of a self-attaching nut according to the present disclosure.
Figure 14:
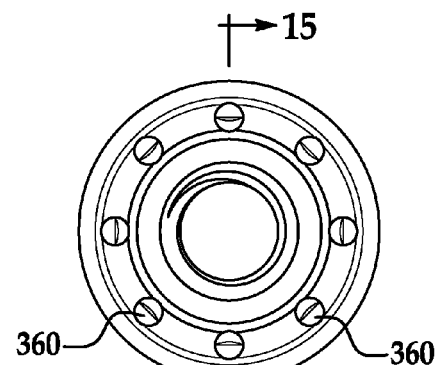
FIG. 14 is an end view of the self-attaching nut shown in FIG. 13.
Figure 15:
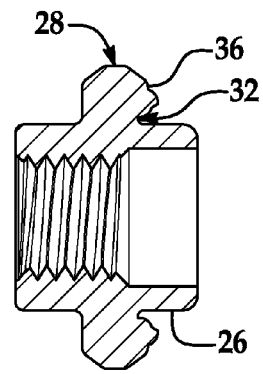
FIG. 15 is a side cross-sectional view taken along line 15-15 of FIG. 14.

Referring now to FIGS. 13-15, in embodiments of a self-attaching nut 320, each of the plurality of spaced raised buttons 360 may be a pair of substantially hemispherical shapes abutting at offset bases with a substantially flat facet 62' defined thereon, the substantially flat facet 62' being oblique to a radius of the bore 24.

Figure 16:
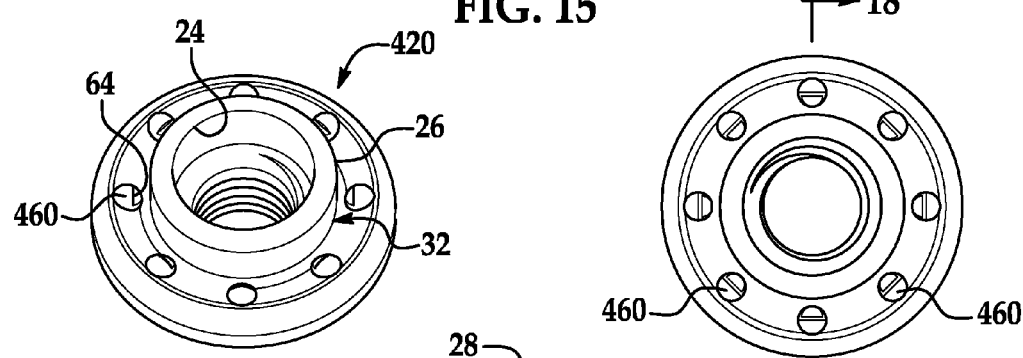
FIG. 16 is an end perspective view of another embodiment of a self-attaching nut according to the present disclosure.
Figure 17:
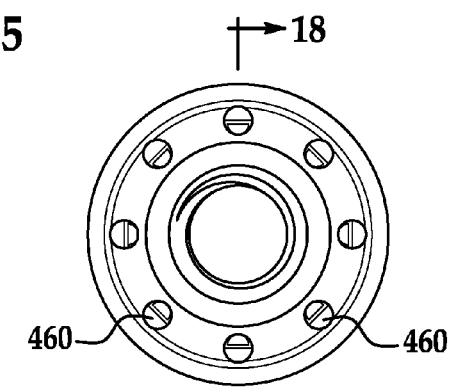
FIG. 17 is an end view of the self-attaching nut shown in FIG. 16.
Figure 18:
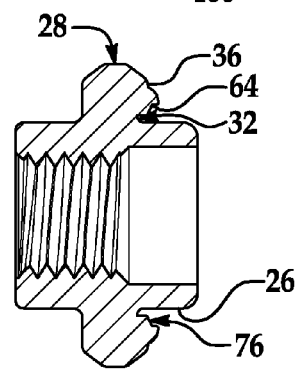
FIG. 18 is a side cross-sectional view taken along line 18-18 of FIG. 17.

In embodiments of a self-attaching nut 420 shown in FIGS. 16-18, each of the plurality of spaced raised buttons 460 may be a substantially spherical cap shape with a substantially prismatic notch 64 defined therein, the prismatic notch 64 being substantially perpendicular to a radius of the bore 24 and having a substantially flat surface 76 oblique to the radius of the bore.

Referring now to FIGS. 19-21, in embodiments of a self-attaching nut 520, each of the plurality of spaced raised buttons 560 may be substantially a right prism 68 having a polygon-shaped cross section 69. A 6-pointed star polygon is shown in FIGS. 19-21, but it is to be understood that a polygon may have any number of sides, and may be convex, non-convex, simple, concave, or combinations thereof.

In embodiments of a self-attaching nut 720 shown in FIGS. 22-24, each of the plurality of spaced raised buttons 760 may be a substantially spherical cap shape with at least two contiguous facets 70 of a pyramid 72 defined on a radially inward facing portion 74 of the spherical cap. FIGS. 22-23 show three contiguous facets of a pentagramic pyramid 72, but it is to be understood that a pyramid 72 having any number of sides is contemplated as being within the purview of the present disclosure. It is to be further understood that the facets 70 of the pyramid 72 may be substantially planar, convex or concave.

Figures 25, 26, 27:
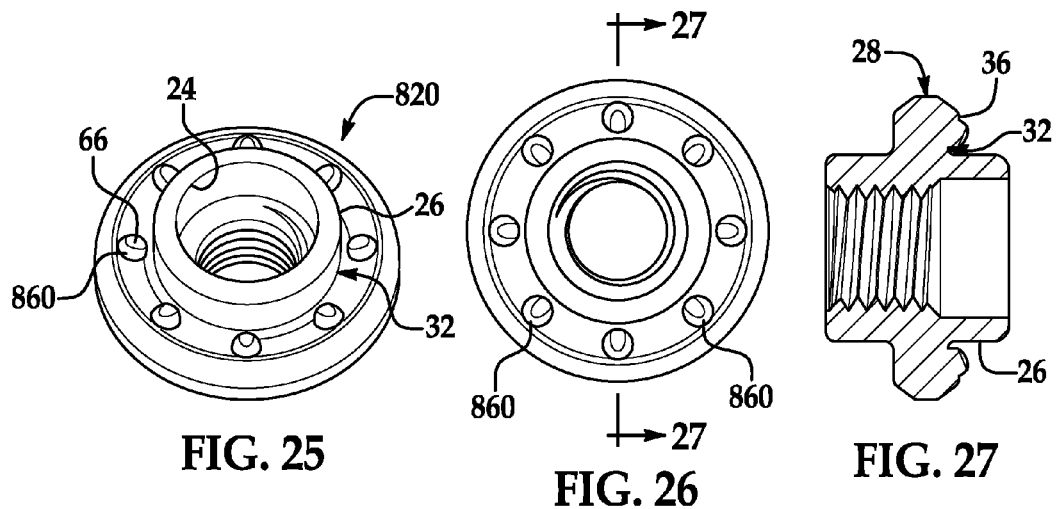
FIG. 25 is an end perspective view of yet another embodiment of a self-attaching nut according to the present disclosure.
FIG. 26 is an end view of the self-attaching nut shown in FIG. 25.
FIG. 27 is a side cross-sectional view taken along line 27-27 of FIG. 26.

Referring now to FIGS. 25-27, in embodiments of a self-attaching nut 820, each of the plurality of spaced raised buttons 860 may be a substantially spherical cap shape with a substantially cylindrical notch 66, the cylindrical notch being disposed longitudinally relative to a radius of the bore 24.

Figure 32:
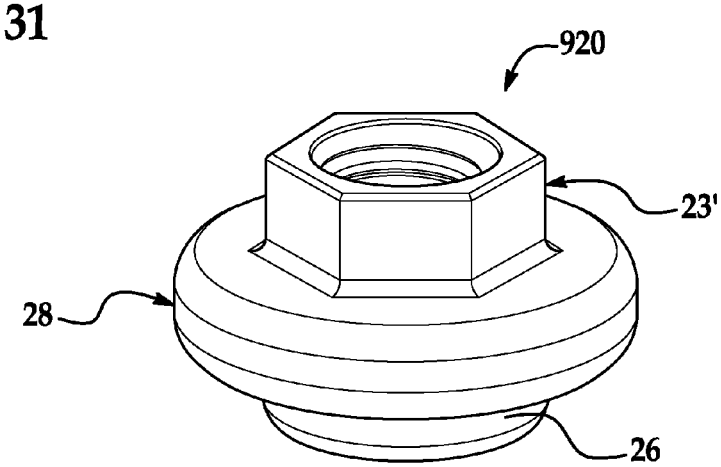
FIG. 32 is a top end perspective view of yet another embodiment of a self-attaching nut according to the present disclosure.
Figure 33:
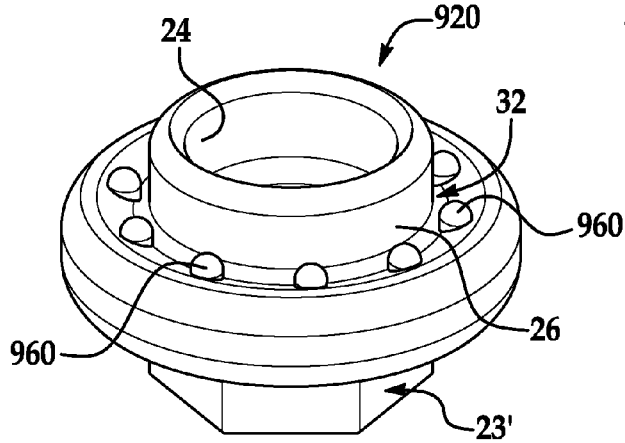
FIG. 33 is a bottom end perspective view of the embodiment show in FIG. 32.

FIGS. 32 and 33 depict embodiments of a self-attaching nut 920, each having a plurality of spaced raised buttons 960. Each of the raised buttons 960 may be a substantially hemispherical shape having a base that lies substantially within a plane perpendicular to the longitudinal axis of the bore 24.

It is to be understood that each of the plurality of spaced raised buttons 160, 260, 360, 460, 560, 760, 860, 960 may be substantially regularly spaced on a surface of the V-shaped annular groove 32. As shown in, e.g., FIGS. 8, 11, 14, 17, 20, 23 and 26, "regularly spaced" may include substantially equal spacing about a circumference of a circle having a center on the longitudinal axis of the bore 24. Further, the plurality of spaced raised buttons according to embodiments disclosed herein may be regularly spaced and substantially equidistant from the longitudinal axis of the bore 24 (i.e., on a circle having a center on the longitudinal axis of the bore 24). However, "regularly spaced" also may include a repeating pattern around the surface of the V-shaped annular groove 32.

Figure 31:
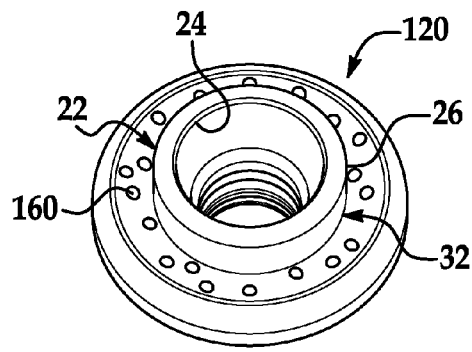
FIG. 31 is an end perspective view of a further embodiment of a self-attaching nut according to the present disclosure.

In an embodiment, e.g., as shown in FIG. 31, each of the plurality of spaced raised buttons 160 may be substantially irregularly spaced on a surface of the V-shaped annular groove 32. Substantially irregular spacing is meant to include substantially random and pseudo-random distribution, as well as spacing where no repeating pattern is established.

Figures 28, 29, 30:
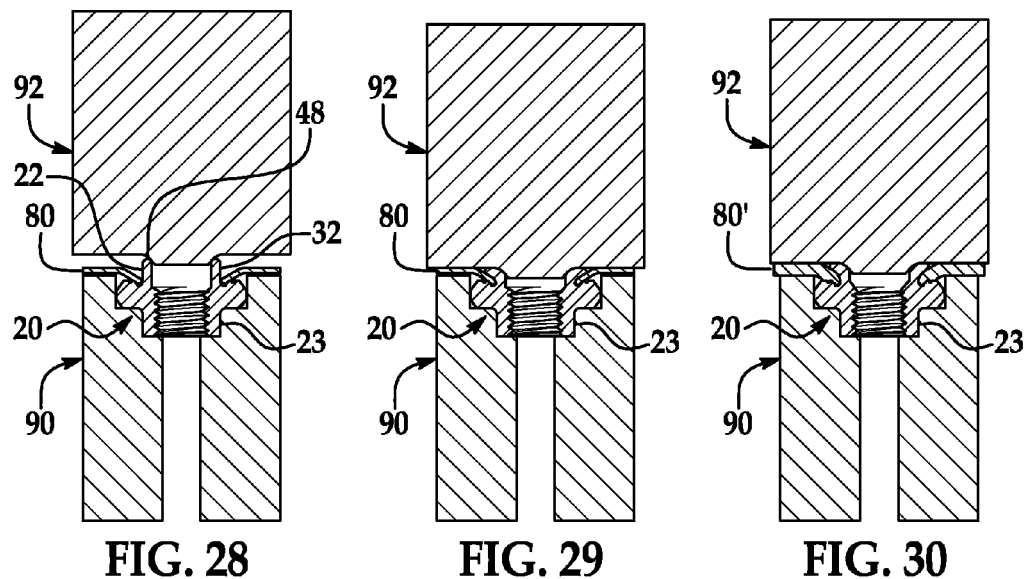
FIG. 28 is a cross-sectional view of a self-attaching nut and a thin sheet metal panel in an assembly device prior to applying installation loads.
FIG. 29 is a cross-sectional view of a self-attaching nut and a thin sheet metal panel in an assembly device after installation loads have been applied.
FIG. 30 is a cross-sectional view of a self-attaching nut and a thick sheet metal panel in an assembly device after installation loads have been applied.

Referring now to FIGS. 28-30, the present disclosure includes a method for installing embodiments of the self-attaching nut 20, 120, 220, etc. in a panel 80, 80'. The self-attaching nut 20, 120, 220, etc. may be installed in a pre-formed hole in a sheet metal panel 80, 80'. The panel 80, 80' may be pre-formed to nest within the substantially V-shaped annular groove 32. Installation may be performed in a top down mode with an installation head (not shown). Alternatively, a bottom up installation mode may be used (as shown in FIGS. 28-30). It is to be understood that in the bottom up mode, the panel 80, 80' may be pre-formed as shown in FIGS. 28-30, or the panel may include a hole without pre-forming the panel to nest within the substantially V-shaped annular groove 32.

During installation, panel 80, 80' seats around the central pilot portion 22 of the nut 20, as shown in FIG. 28. Tubular body extension 23 of the nut is securely seated in the holder 90 of an installation head assembly (not shown). An installation die button 92 engages a tip 48 of a central pilot portion 22, forming a plastically deformable end. The installation die button 92 moves toward the holder 90, forcing the central pilot portion 22 to deform away from the longitudinal axis of the bore 24 and toward the flange portion 28 of the self-attaching nut 20.

This motion of the installation die button 92 causes the sheet metal panel 80, 80' to plastically deform around the rotation-resisting and pull-out resisting formations 160, 260, etc. in the substantially V-shaped annular groove 32. The plastically deformed central pilot portion 22 traps panel 80 material between the surface of the deformed central pilot portion 22 and the substantially V-shaped annular groove 32.

Thus, the self-attaching nut 20, 120, 220, etc. is secured to the sheet metal panel 80, 80', as shown in FIGS. 29 and 30.

It is to be understood that panel 80, 80' may be thin sheet metal (as shown at reference numeral 80 in FIGS. 28 and 29), or thick sheet metal (as shown at reference numeral 80' in FIG. 30). In this disclosure, thin sheet metal ranges from about 0.5 mm to about 1.5 mm in thickness. Thick sheet metal ranges in thickness from about 1.5 mm to about 7 mm.

The present inventors have unexpectedly and fortuitously discovered that buttons 160, 260, etc. as disclosed herein demonstrate superior performance in torque twist-out testing. Torque twist-out performance is defined as a resistance to relative rotation between the self-attaching nut 120, 220, etc. and the panel 80, 80' to which the self-attaching nut 120, 220, etc. is attached. Further, the resistance to relative rotation is present without the self-attaching nut 120, 220, etc. and panel 80, 80' being in a state of clamp with a mating panel. Therefore, torque twist-out is a measure of the anti-rotational strength of a joint formed between the self-attaching nut 20 and the panel 80, 80'.

It is to be understood that various embodiments of buttons 160, 260, etc. disclosed herein may be combined in a single self-attaching nut (not shown). For example, a single self-attaching nut may include both buttons 160 and buttons 360, arranged in an alternating manner or in any other desired manner.

A self-attaching nut 120, 220, etc. of this type resists rotation prior to being in a state of clamp to allow assembly with a mating fastener. If torque applied to the self-attaching nut 120, 220, etc. by a mating fastener (not shown) exceeds the torque twist-out resistance of the self-attaching nut 120, 220, etc., then the self attaching nut will simply spin on the panel. When this spinning on the panel occurs, a properly assembled joint cannot be achieved. Good torque twist-out performance ensures that a properly assembled joint can be achieved.

The self-attaching nut 120, 220, etc. disclosed herein has shown, on average, a torque twist-out improvement of 50% over the same panel range as current relevant products on the market. This applies to self-attaching nuts designed for thread sizes M6 through M12 used in panel 80, 80' having thicknesses ranging from about 0.75 mm to about 4.00 mm.

It is to be understood that the panel 80, 80' may include a single layer of material, for example steel. However, the panel 80, 80' may also include an engineered multilayer composite with a viscoelastic core among layers of metal. A non-limiting example of the engineered multilayer composite material is Quiet Steel®. Quiet Steel® is a registered trademark of Material Sciences Corporation.

It is to be understood that disclosure of any ranges herein is for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a thickness range of 0.75 mm to 4.00 mm should be interpreted to include not only the explicitly recited limits of 0.75 mm to 4.00 mm, but also to include individual thicknesses such as 0.85 mm, 3 mm, etc., and sub-ranges such as 0.9 mm to 3.5 mm, etc.

While several embodiments have been described in detail, it will be apparent to those skilled in the art that the disclosed embodiments may be modified. Therefore, the foregoing description is to be considered exemplary rather than limiting.

What is claimed is:

1. A self-attaching nut for attachment to a panel, comprising:

a central pilot portion having a bore therethrough, and having a substantially cylindrical outer surface;

a flange portion surrounding the outer surface of the pilot portion, the flange portion including:
   an annular back face surrounding the central pilot portion;
   an opposed face distal to the annular back face; and
   an annular groove defined in the opposed face surrounding the pilot portion, the annular groove having a substantially V-shaped axial cross section;

a tubular body extension projecting from the annular back face;

a tubular pilot portion of the central pilot portion projecting from the opposed face distal to the tubular body extension; and a plurality of formations formed on a surface of the annular groove, the formations consisting of spaced raised buttons having an at least partially spherical shape configured to substantially prevent relative rotation between the nut and the panel, and configured to aid in preventing pull-out of the nut from the panel.

2. The self-attaching nut as defined in claim 1 wherein at least one of the plurality of spaced raised buttons is a spherical cap shape.

3. The self-attaching nut as defined in claim 1 wherein each of the plurality of spaced raised buttons is a spherical cap shape.

4. The self-attaching nut as defined in claim 1 wherein at least one of the plurality of spaced raised buttons is a spherical cap shape with a circumferentially concave facet defined thereon, the circumferentially concave facet substantially concentric with the bore.

5. The self-attaching nut as defined in claim 1 wherein at least one of the plurality of spaced raised buttons is a pair of hemispherical shapes abutting at offset bases with a substantially flat facet defined thereon, the substantially flat facet being oblique to a radius of the bore.

6. The self-attaching nut as defined in claim 1 wherein at least one of the plurality of spaced raised buttons is a spherical cap shape with a substantially prismatic notch defined therein, the prismatic notch substantially perpendicular to a radius of the bore, and having a substantially flat surface oblique to the radius of the bore.

7. The self-attaching nut as defined in claim 1 wherein at least one of the plurality of spaced raised buttons is a spherical cap shape with a substantially cylindrical notch, the cylindrical notch disposed longitudinally relative to a radius of the bore.

8. The self-attaching nut as defined in claim 1 wherein at least one of the plurality of spaced raised buttons is a spherical cap shape with at least two contiguous facets of a pyramid defined on a radially inward facing portion of the spherical cap.

9. The self-attaching nut as defined in claim 1 wherein each of the plurality of spaced raised buttons is substantially regularly spaced on a surface of the annular groove.

10. The self-attaching nut as defined in claim 1 wherein at least one of the plurality of spaced raised buttons is substantially irregularly spaced on a surface of the annular groove.

11. The self-attaching nut as defined in claim 1 wherein:
   each of the plurality of spaced raised buttons is a formation having a ratio of a largest height dimension to a largest width dimension of less than about 1; and
   the largest height dimension is in a direction substantially parallel to the longitudinal axis of the bore and the largest width dimension is orthogonal to a line along the height dimension.

12. A self-attaching nut for attachment to a panel, comprising:
   a central pilot portion having a bore therethrough, and having a substantially cylindrical outer surface;
   a flange portion surrounding the outer surface of the pilot portion, the flange portion including:
      an annular back face surrounding the central pilot portion;
      an opposed face distal to the annular back face; and
      an annular groove defined in the opposed face surrounding the pilot portion, the annular groove having a substantially V-shaped axial cross section;
   a tubular body extension projecting from the annular back face;
   a tubular pilot portion of the central pilot portion projecting from the opposed face distal to the tubular body extension; and
   a plurality of hemispherical raised buttons formed on a surface of the annular groove, the buttons spaced regularly and substantially equidistant from an axis of the bore; the raised buttons configured to substantially prevent relative rotation between the nut and the panel, and configured to aid in preventing pull-out of the nut from the panel.

* * * * *